H. D. Snow. Sheet 1, 2 Sheets.

Water Wheel Governor.

No. 3,528. Reissued Jun. 29, 1869.

Witnesses
Chas. H. Smith
Geo. D. Wade

Inventor
Henry D. Snow
per L. W. Serrell
Atty

H. D. Snow. Sheet 2, 2 Sheets.

Water Wheel Governor.

No. 3,528. Reissued Jun. 29, 1869.

Witnesses

Chas. A. Smith

Geo. D. Walker

Inventor

Hervey D. Snow

Wm. L. Sewell

Atty

UNITED STATES PATENT OFFICE.

HERVEY D. SNOW, OF BENNINGTON, VERMONT.

IMPROVEMENT IN WATER-WHEEL REGULATORS.

Specification forming part of Letters Patent No. 79,870, dated July 14, 1868; Reissue No. 3,528, dated June 29, 1869.

*To all whom it may concern:*

Be it known that I, HERVEY D. SNOW, of Bennington, in the county of Bennington and State of Vermont, have invented and made a certain new and useful Improvement in Water-Wheel Regulators; and I do hereby declare the following to be a full, clear, and exact description of the said invention, reference being had to the annexed drawings, making part of this specification, wherein—

Figure 1:
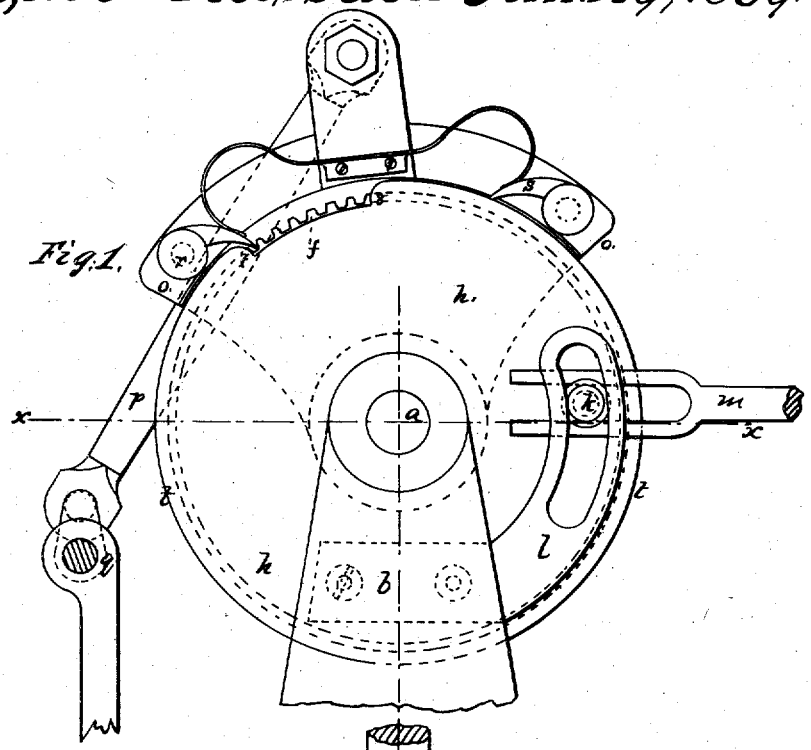
Figure 3:
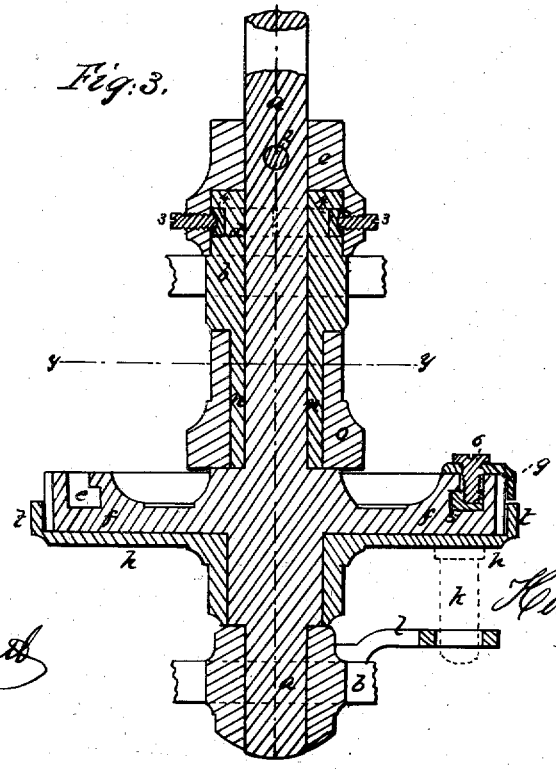
Figure 2:
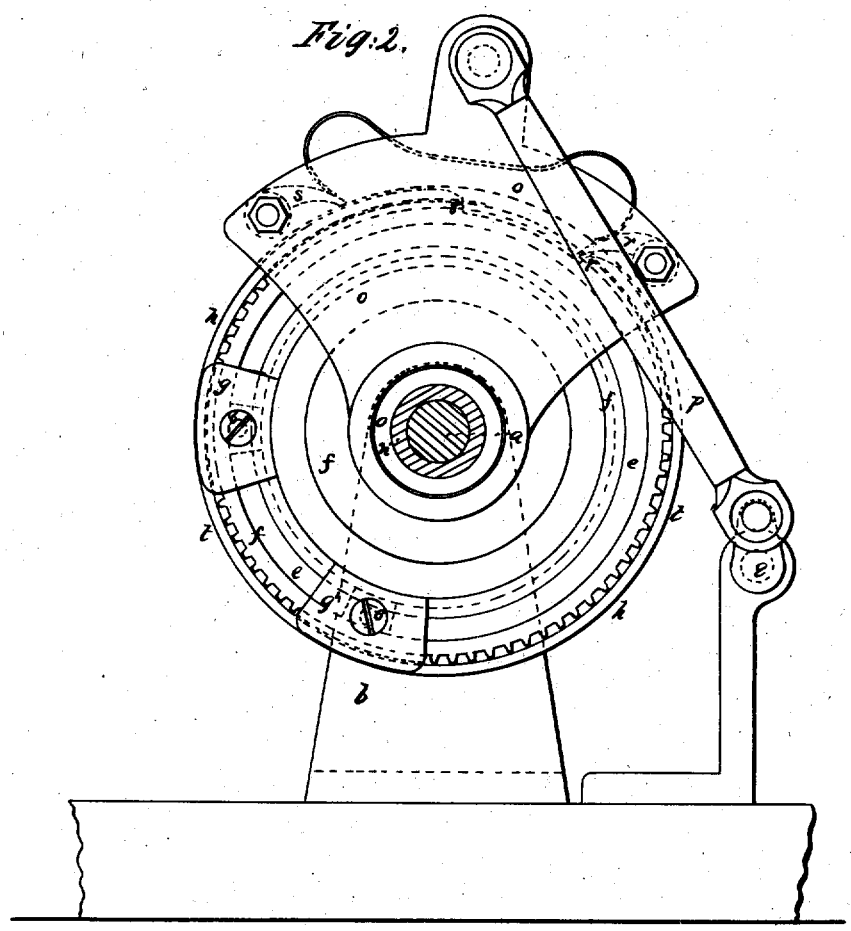

Figure 1 is an elevation at one side of said regulator. Fig. 2 is an elevation of the same at the other side, the shaft being in section at the line *y y*, Fig. 3; and Fig. 3 is a sectional plan at the line *x x*, Fig. 1.

Similar marks of reference denote the same parts.

The nature of my said invention consists in peculiar mechanism applied between a governor (operating by a change of speed) and the gate or device for regulating the flow of water to the wheel, said mechanism being inoperative while the speed remains at the regular standard, and being brought into action by an increase or decrease of the speed to admit more or less water to the wheel, and an adjustable stop or stops are applied to said mechanism to prevent the supply of water being entirely shut off or the gate opened too wide. By my device there is no risk of the governor operating too far in overcharging the wheel or cutting off too much of the supply before the momentum of the parts allows the governor to act; hence the speed is much more uniform than heretofore.

In the drawings, *a* is a shaft set in standards *b b* and extending to and connected with the device that acts upon the gate or other regulator of the flow of water to the wheel. A pinion on this shaft *a* acting upon a rack that is connected with the gate is the most usual mode of connecting the regulator.

In order to prevent the weight of the gate or any of the connecting parts from turning the shaft *a*, I apply a friction consisting of the hub *c* upon the shaft *a*, secured by the pin 2, and receiving set-screws 3 3, that act upon clamping-segments 4 4, that are placed within a groove around the projecting collar *d* upon one side of the bearing *b*. By this means the desired amount of friction can be obtained, but the parts can be turned, as hereinafter described.

The shaft *a* has permanently affixed upon it the ratchet-wheel *f*, and in the face of this ratchet-wheel is a circular undercut groove at *e*, into which nuts 5 are introduced, taking the screws 6 of the adjustable flanged stops *g g'*, the flanges of which are of width equal to about half the thickness of the ratchet-wheel *f*. These stops *g g'* can be moved around to any desired points on the ratchet-wheel *f* and clamped by the screws 6.

On the other side of the ratchet-wheel *f* to the stops *g g'* is the disk *h*, that may have a flange, *t*, around its edge of a width equal to about half the thickness of the said wheel *f*, and this flange is removed between the parts 7 and 8, as seen in Fig. 1. This disk *h* might be formed as an open wheel, or with arms carrying the flange *t* at the sides of the opening between 7 and 8.

In the side of *h* is a pin, *k*, projecting into a curved slot in the stationary arm *l*, and said slot limits the turning movement that may be communicated to this disk *h* by means of a lever, *m*, or other mechanism connected with the governor.

Around a sleeve, *n*, that extends from the bearing *b* is the hub of the pawl-carrier *o*, that is continuously oscillated by the connecting-rod *p* to a crank on a shaft, *q*, that is revolved by any suitable connection to the shafting.

Upon the pawl-carrier *o* are the pawls *r* and *s*, acted upon by springs, and placed with their points toward each other. When the governor is revolving at the designated speed, the ends of the pawls *r* and *s* slide upon the flange *t* and do not pass beyond the points 7 and 8, and hence do not move the ratchet-wheel *f*. If the governor is increased in speed, the disk *h* is moved by the pin *k*, and the opening in the flange *t* between 7 and 8 comes into such a position that one of the pawls *r s* can act upon the teeth of the wheel *f*, turning that, and by the connections moving the gate to regulate the supply of water; and when the governor-balls fall to their standard speed, the turning of the disk *h* prevents the further action of the pawl.

It is to be understood that when the speed of the governor is lessened the parts operate in the reverse direction to what they do when the speed is increased.

If the speed of the water-wheel and parts is not sufficiently regulated to produce a reverse motion from the governor by the time one of the stops *g* or *g'* comes around beneath the pawl *r* or *s* that is in action, said stop running under the said pawl will raise it and arrest its further operation upon the ratchet-teeth; hence by adjusting these stops *g* and *g'* the point to which the supply of water can be opened or closed will be determined, and thereby the regulator made more uniform and reliable in its operation, thus preventing the great fluctuations of speed usually resulting from the action of regulators to water-wheels.

What I claim, and desire to secure by Letters Patent, is—

1. The pawls *r s*, in combination with the ratchet-wheel *f*, that operates to move the gate or regulator, and the connection to the governor, substantially as set forth.

2. The disk *h*, operated by a connection to a governor, in combination with a pawl and ratchet for causing the pawl to be operative or inoperative, according to the speed of the governor.

3. The disk *h*, in combination with a pair of pawls pointing toward each other and acting in opposite directions, substantially as set forth, so that the disk determines which of the pawls shall be operative or throws both out of action.

4. The stop *g* or *g'*, arranged substantially as set forth, whereby to relieve the pawl *r* or *s* and prevent the same operating beyond a certain point, irrespective of the movement of the governor, substantially as set forth.

In witness whereof I have hereunto set my signature this 8th day of March, A. D. 1869.

H. D. SNOW.

Witnesses:
ORIN D. ADAMS,
JAS. B. MEACHAM.